Figure 1:
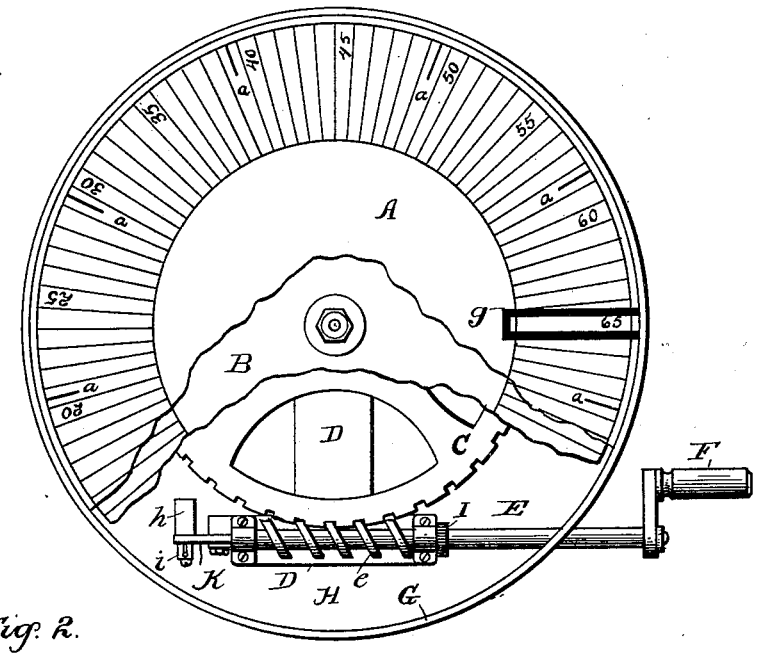

No. 681,951. Patented Sept. 3, 1901.
E. A. CLARK.
SYSTEM OF ELECTRICAL INTERCOMMUNICATION.
(Application filed June 8, 1896.)
(No Model.) 3 Sheets—Sheet 1.

Witnesses
Victor J. Evans
O. E. Fraitmayer

Inventor
Emery A. Clark.
by E. M. Markle & Son
Attorneys

No. 681,951. Patented Sept. 3, 1901.
E. A. CLARK.
SYSTEM OF ELECTRICAL INTERCOMMUNICATION.
(Application filed June 8, 1896.)
(No Model.) 3 Sheets—Sheet 2.
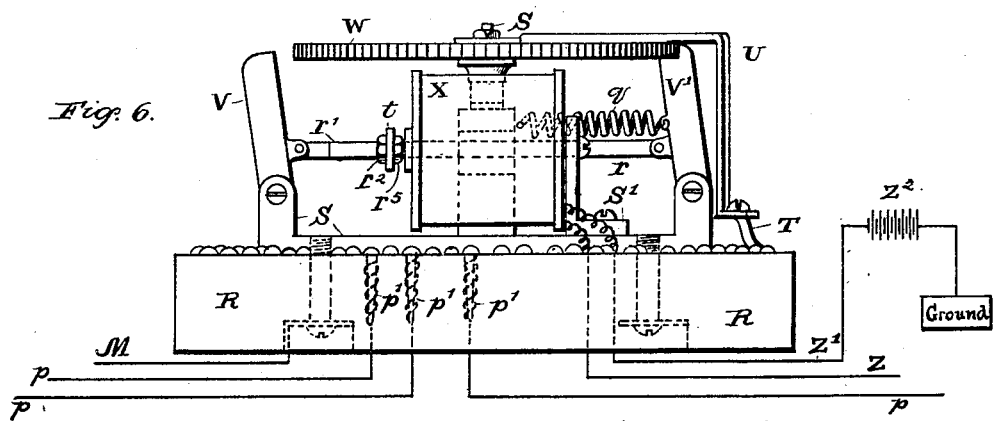
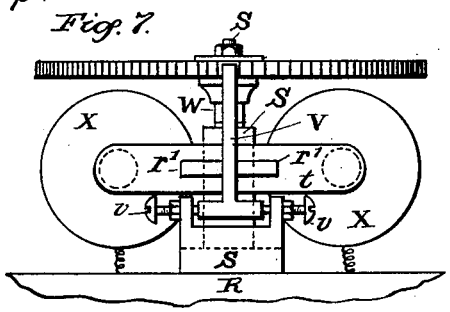
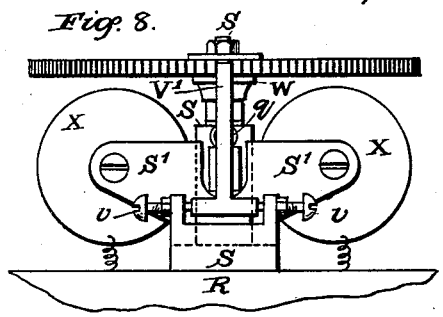
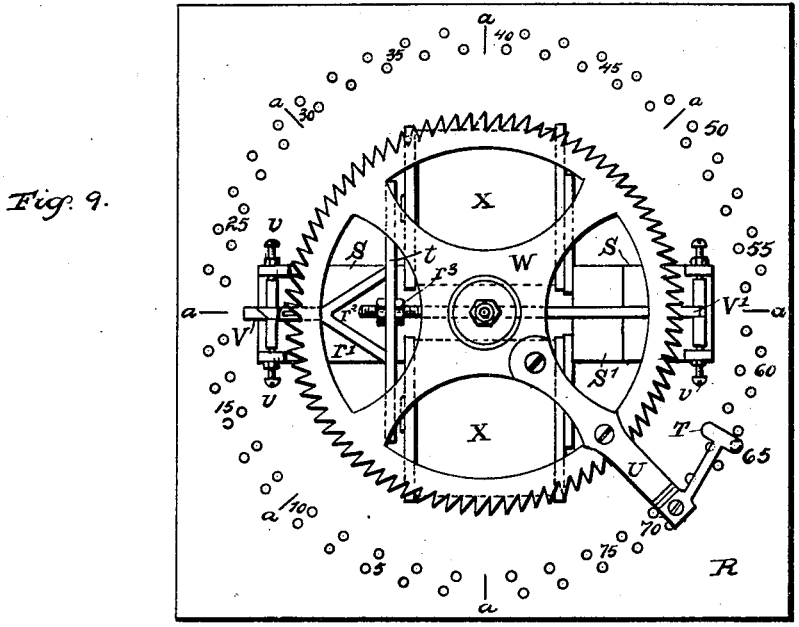
Witnesses
Victor J. Evans.
O. E. Brautmayer
Inventor
Emery A. Clark.
by E. M. Mask & Son
Attorneys No. 681,951. Patented Sept. 3, 1901.
E. A. CLARK.
SYSTEM OF ELECTRICAL INTERCOMMUNICATION.
(Application filed June 8, 1896.)
(No Model.) 3 Sheets—Sheet 3.
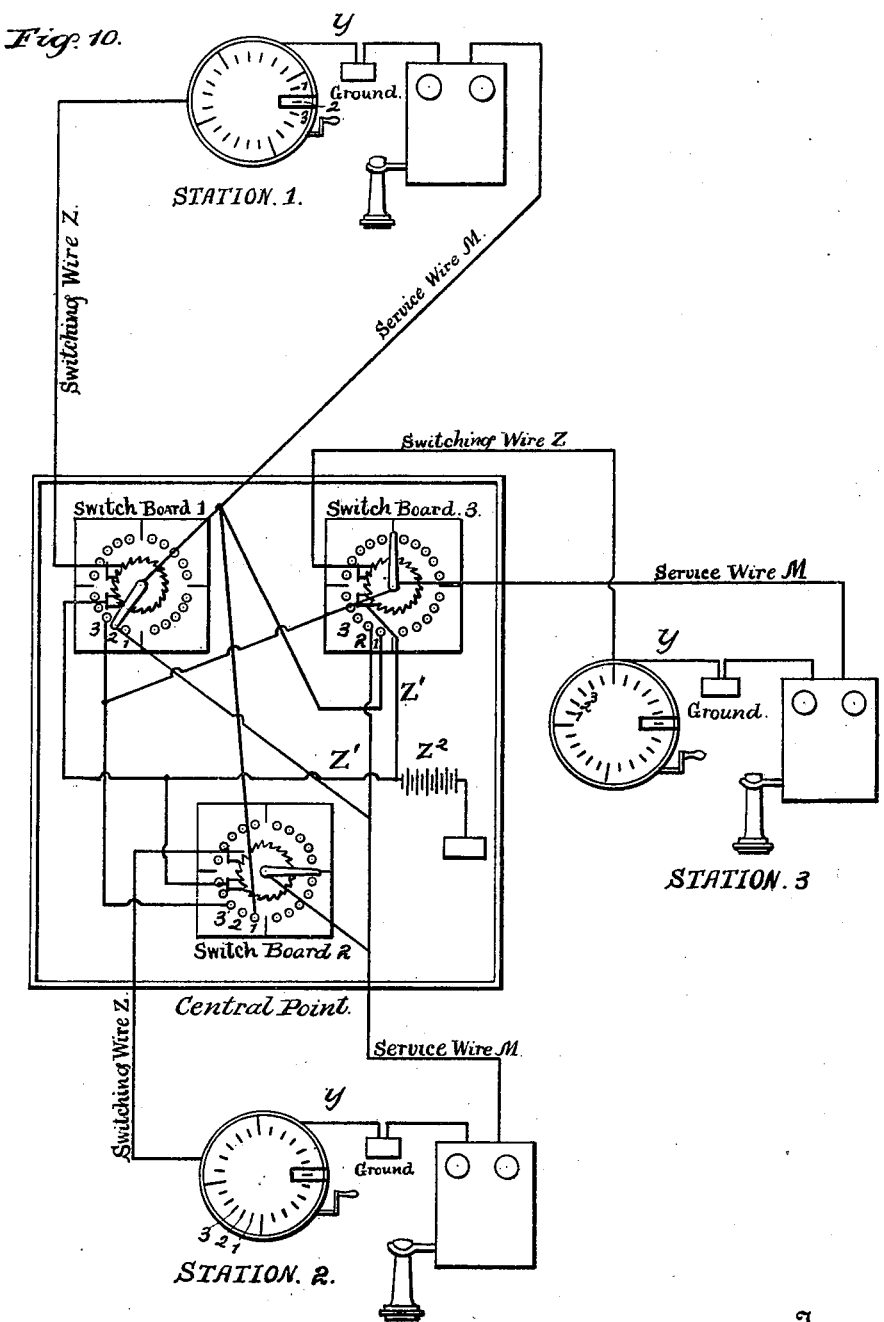
Witnesses
Victor J. Evans.
Inventor
Emery A. Clark.
by E. M. Mackl & Sons
Attorneys

UNITED STATES PATENT OFFICE.

EMERY A. CLARK, OF SIOUX CITY, IOWA, ASSIGNOR, BY MESNE ASSIGN-
MENTS, TO THE CLARK AUTOMATIC TELEPHONE SWITCH-BOARD COM-
PANY, OF PROVIDENCE, RHODE ISLAND.

SYSTEM OF ELECTRICAL INTERCOMMUNICATION.

SPECIFICATION forming part of Letters Patent No. 681,951, dated September 3, 1901.

Application filed June 8, 1896. Serial No. 594,767. (No model.)

*To all whom it may concern:*

Be it known that I, EMERY A. CLARK, a citizen of the United States, residing at Sioux City, in the county of Woodbury and State of Iowa, have invented certain new and useful Improvements in Systems of Electrical Intercommunication; and I do hereby declare the following to be a full, clear, and exact description of the invention, such as will enable others skilled in the art to which it appertains to make and use the same.

My invention relates to improvements in instruments used in connection with systems of electrical intercommunication, and particularly automatic telephone-exchange systems; and it consists in the improved transmitter and receiver, which will be hereinafter fully described, and particularly pointed out in the claims.

My invention is especially designed for use in connection with the system of electrical intercommunication described in Patent No. 498,236, granted to me May 30, 1893, in which such connections are described as being established between service instruments—such as telephones, telegraph instruments, &c.—which are stationed at outlying points in the system determined by the subscribers and a central switchboard, so that any one or more of the subscribers can place himself or themselves in communication with each other automatically without calling upon a third person at a central office to make the desired connection.

The object of my present invention is to provide a transmitter and a receiver by the use of which the action of the system will be rendered more certain, the maintenance thereof more economical, and the establishment of any desired connection easily and rapidly accomplished.

Heretofore the main difficulty that has been developed in connection with systems for automatically establishing connections between two or more subscribers has been that of providing for the synchronous movement of the indicator of the transmitter and the switch-wheel of the receiver under the control of each subscriber. It is necessary that these two parts always occupy corresponding positions in order that an automatic exchange system may be practical, because otherwise there is extreme difficulty in providing means whereby a subscriber can ascertain the relative position of the switch-wheel of his receiver and know what action to take in order to cause such switch-wheel to establish any desired connection.

In accomplishing the object of my invention I have provided for a continuously-forward movement of the switch-wheel of the receiver, making use of a circuit making and breaking mechanism operated through the movement of the dial of the transmitter to cause the switch-wheel of the receiver to move forward with a step-by-step movement with each forward movement of the dial and to be always in unison therewith.

The indicator of the improved transmitter which I have devised consists in its present form of a revoluble dial having thereon the names, numbers, or other designations of the connections which it is desired to establish, and means are provided for moving the dial relative to a fixed point continuously forward, so that any desired name, number, or other designation may be placed in coincidence with such point. During the movement of the indicator to the desired position a circuit making and breaking mechanism is brought into action which interrupts or breaks the circuit each time a name, number, or other designation on the dial passes the fixed point before referred to, thereby causing a movement of the switch-wheel of the receiver corresponding to that undergone by the dial of the transmitter. The number of names, numbers, or other designations on the dial corresponds with the number of teeth formed on the switch-wheel, and as a forward movement of the switch-wheel corresponding to that of the dial takes place each time that the dial is moved it will be seen that the dial and the switch-wheel move synchronously and are always in unison. Means are further provided in the transmitter for preventing the making of superfluous contacts through the revolution of the dial and for insuring the stoppage of the dial at such a point as to leave the circuit open, so that no waste of the current established will take place. A great economy in the operation of the system is thus effected.

The receiver which I make use of has for its principal feature a revoluble switch-wheel which rotates in the center of a circular series of contact-points equal in number to the number of teeth formed on said switch-wheel or the number of names, numbers, or other designations on the face of the dial of the transmitter. To the switch-wheel is rigidly attached an arm which is adapted to successively contact with each of the contact-points circularly arranged around the same, and thus to establish connection between the service instruments of the subscribers. The circuits of this system are such that when the switch-wheel has reached a position corresponding to that occupied by the indicator of the transmitter a connection is established between the service instrument of the subscriber who is operating his transmitter and that of the person whose name, number, or other designation appears on the face of the subscriber's dial in coincidence with the fixed point thereon.

My invention is fully illustrated in the drawings, which accompany and form a part of this application, in which the same reference-letters refer to the same or corresponding parts, and in which—

Figure 2:
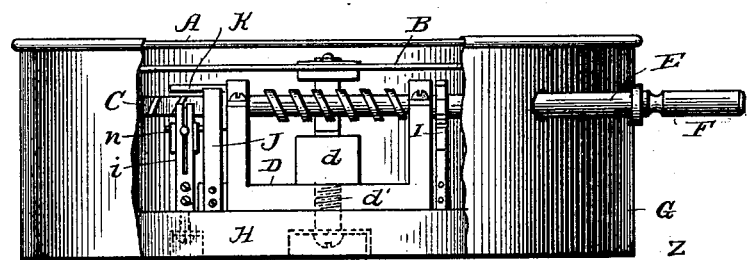
Figure 3:
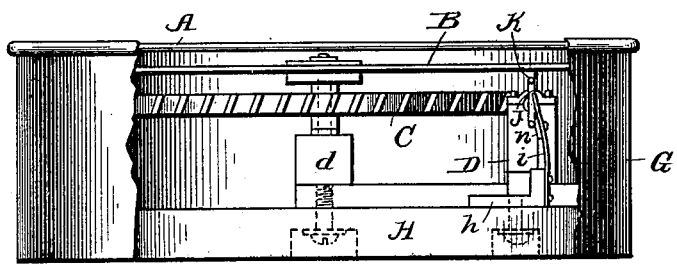
Figure 4:
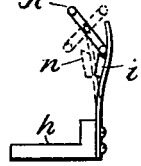
Figure 5:
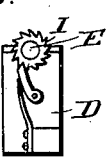

Figure 1 is a front view of my transmitter, the indicator-dial being partially broken away to show the arrangement of the mechanism for operating the same. Fig. 2 is a side elevation of my transmitter, a portion of the case being broken away to show in elevation the worm mechanism for causing movement of the dial. Fig. 3 is also a side elevation of my transmitter, a portion of the case being broken away to show the circuit making and breaking mechanism. Fig. 4 is a detail view of the circuit making and breaking mechanism, the full lines showing the parts in the position they assume when the circuit is made and the dotted lines when the circuit is broken. Fig. 5 is a detail view of the ratchet-and-pawl mechanism used to prevent backward movement of the indicator. Fig. 6 is a side elevation of the receiver, showing the switch-wheel thereof and the lever fixed thereto which establishes connection with the circular series of contact-points arranged at the base thereof. Fig. 7 is an end elevation of the receiver, showing the magnets and their armature. Fig. 8 is also an end elevation of the receiver, but is so taken as to show the end of the magnets opposite to that shown in Fig. 7. Fig. 9 is a top plan view of the receiver, showing the circular series of contact-points. Fig. 10 is a diagrammatic view of an automatic telephone-exchange composed of three members.

I have stated that my invention consists in the novel construction of my transmitter and of my receiver. I will now proceed to describe these instruments in detail and then describe the system in connection with which they are represented as being used.

*Transmitter.*—Referring to the drawings, and especially to Figs. 1 to 5, inclusive, G is a case, of metal or other suitable material, preferably nickel-plated in order to give the same a neat and attractive appearance. This case is circular in form and is provided with a base H, of wood or other insulating material. To the wooden base H is secured the base-plate D, which is provided in the center of the case with a boss $d$, perforated in order to permit the passage therethrough of the shaft $d'$, upon which the indicator or dial B is mounted, as well as the gear-wheel C, and with suitable bearings for the worm-shaft E, which is adapted to cause the revolution of the gear-wheel C and is operated by revolution of the crank F, attached thereto. The base-plate D and all the parts connected therewith are placed in connection with the outside circuit through the switch-wire Z, which enters, as shown in Fig. 2, through a depression in the center of the base H.

The transmitter is provided with a glass cover A in order to prevent the entrance of dust and dirt. Immediately beneath the cover appears the revoluble indicator or dial B, upon which the names, numbers, or other designations of the connections which it is desired to establish through the use of the transmitter are indicated. In the drawings I have shown the dial as being constructed for a system of eighty subscribers and have indicated the position of the subscribers on the dial by the use of numbers, only every fifth number being written, however, for convenience. I have also shown a number of blank spaces $a$, which are to provide for the addition of more subscribers to the system after the regular dial-plate has been completely filled. These blank spaces may be scattered uniformly around the circumference of the dial, as shown, or grouped together; but the arrangement which I illustrate is that preferred. Instead of representing the subscribers by the use of numbers the names of the subscribers can be written upon the face of the dial or any other designation can be employed. In my transmitter the establishment of any desired connection is effected by the movement of the dial relative to a fixed point and the consequent making and breaking of the circuit between the transmitter and the receiver a number of times corresponding to the distance of the name of the subscriber with whom the connection is desired to be established from that of the subscriber operating his transmitter. In the drawings I have utilized to define this fixed point a panel $g$, painted on the face of the cover for the dial. This panel is of sufficient size to permit a single name, number, or other designation to be observed through the same, and when the dial is in its normal position the number of the subscriber to whom the same belongs appears beneath the same. In the operation of the transmitter the dial is turned until the number of the subscriber with whom connection is desired to be established appears underneath the panel. The revolution of the dial is occasioned through the revolution of the gear-wheel C, mounted on the shaft $d'$, on which the dial is also mounted. The gear-wheel C is formed upon its periphery with a series of depressions or grooves, with which engage the worm-threads upon worm-shaft E. To one end of the shaft E is attached the crank F. Movement of the dial can thus be effected by revolution of the crank F; but the connection between the worm-shaft and dial is such that the movement of the dial will be slow and uniform and will take place without sudden jerks and movements. In my present construction the revolution of the dial through a single space is effected by a half-turn of the crank F, and therefore of the worm-shaft E. The direction of movement of the crank-shaft is continuously forward, movement in the opposite direction being prevented by the ratchet-wheel I, which is mounted upon the worm-shaft E and is engaged by a suitable spring-pressed pawl.

The circuit making and breaking mechanism which I have devised for use with my present style of transmitter consists of a revoluble body in the circuit of the transmitter-case, which makes contact with a suitable contacting device insulated from the case and forming a portion of the return-circuit of the receiver each time the revoluble dial moves through a single space. I prefer to place the revoluble circuit making and breaking device upon an extended portion of the worm-shaft E, as by this means I am enabled to make the operation of the same coincide with the movement of the worm-shaft, and thereby of the dial, and to use as such device projections equal in number to the number of complete spaces through which the dial is turned by each revolution of the shaft E, which contact with a suitably-placed spring in the return-circuit to the receiver. As in my present construction the dial is caused to move through two spaces by each revolution of the crank, the circuit making and breaking device is in the form of a two-pronged fork K, which is mounted upon the inner end of the worm-shaft E, as shown in Fig. 1, and contacts during its movement with the contact-spring $i$. The contact-spring $i$ is bifurcated in order to insure more certain contact, is secured to an insulated base-plate $h$, which in turn is fastened to the base H, and is grounded through the leading-wire Y. The contact-spring is thus insulated from the case of the transmitter and all the parts therein except when the circuit making and breaking fork K makes contact therewith. The spring is so placed that contact is thus made twice during each complete revolution of the circuit making and breaking device or each time that the revoluble dial of the transmitter moves through a complete space. In other words, the connection is such that the circuit from the transmitter to the receiver is made and broken each time the dial moves through a complete space, so that the switch-wheel of the receiver may move synchronously with the dial.

It is important in the operation of circuit making and breaking devices to prevent the making of additional contacts which would throw the dial of the transmitter and the switch-wheel of the receiver out of unison. In order to prevent the making of such additional contacts, I secure to the inner surface of the contact-spring $i$ a block of insulating material $n$, the upper edge of which is beveled inwardly. The circuit making and breaking fork K first strikes the insulated block $n$ in its revolution and as it continues its movement presses the contact-spring $i$ outward until it passes beyond the edge of the insulated block $n$ and makes contact with the spring $i$. The formation of the edge of the block is such as to prevent a return movement of the circuit making and breaking device, so that only a continuously-forward movement of the same can take place. The circuit through the transmitter is thus completed, but is broken as the circuit making and breaking fork passes the end of the contact-spring $i$ and is not completed until the fork K has been turned through another half a revolution, for the distance between the point of support of the circuit making and breaking fork K and that of the contact-spring $i$ is such that the inward movement of the contact-spring incident to its release from the outward pressure of the circuit making and breaking device is not sufficient to enable it to make contact with such device. The number of contacts which the circuit making and breaking device makes with the contact-spring is thus determined solely by the movement of such spring and is limited to two contacts during each complete revolution of the crank-shaft E or a single contact during each forward movement of the revoluble dial through a complete space.

In order to prevent waste of current and to insure the practical success of my system, it is necessary to provide means for insuring the stoppage of the circuit making and breaking device at such a point as to leave the circuit through the transmitter open. I accomplish this result in my present construction by the use of the spring J, which is secured at one end to the base-plate D and presses with its upper end against a flattened portion of the worm-shaft E. This spring insures the stoppage of the movement of such worm-shaft at such a position that the circuit making and breaking fork K is out of contact with the contact-spring $i$ and the circuit through the transmitter is broken.

The operation of my transmitter is as follows: Normally the dial of the transmitter is so placed that the name of the subscriber to whom the transmitter belongs appears through the panel g. When it is desired to establish any given connection, the crank F is turned until by successive movements the dial has been rotated sufficiently to cause the name, number, or other designation of the subscriber with whom the connection is desired to be established to appear beneath the panel g. This action is caused by the engagement of the threads of the worm-shaft E with the grooves cut in the periphery of the gear-wheel C, which is mounted, as before described, upon the same shaft d' to which is keyed the revoluble dial B. During the forward movement of the dial the circuit through the transmitter has been made and broken each time the dial has moved through a complete space by the action of the circuit making and breaking fork K, which contacts with the spring i, and thus completes the circuit through the transmitter. The relative movement of the circuit making and breaking device K and of the contact-spring i is such that the making of additional or superfluous contacts is impossible; but the contacts which are designed to be made are sharp and distinct and insure the proper action of the circuit. The stoppage of the worm-shaft E in such position as to leave the circuit through the transmitter open is insured by the action of the flat spring J, which presses against a flattened portion of such worm-shaft. It is thus apparent that while the movement of the dial, which has resulted in the bringing of the name of the subscriber with whom the connection is desired to be established underneath the panel g has been taking place, the switch of the receiver has been actuated a number of times corresponding to the number of names, numbers, or other designations which have successively passed beneath the panel g, so that the switch-wheel of the receiver when the movement of the transmitter has ceased is in a position coincident with that of the dial or is in such position as to complete the circuit between the service instruments of the two subscribers.

*Receiver.*—The receiver which I have devised is formed with a base-plate of wood or other insulating material, upon which are arranged in circular series contact-points corresponding in number to the connections which are desired to be established and connected each to a service instrument and to the corresponding contact-points of all the other receivers in the system. Centrally within the contact-points is revolubly mounted a switch-wheel. The switch-wheel is formed with a toothed periphery, the teeth of which correspond in number with the number of contact-points on the base of the receiver or with the number of names, numbers, or other designations on the face of the dial of the transmitter and is caused to revolve with a step-by-step movement through mechanism operated by electromagnets which are in the circuit of the transmitter used in connection with the receiver. A contacting device is rigidly secured to the switch-wheel and is adapted to successively pass over and make contact with the series of contact-points arranged circularly on the base of the receiver, contact being made at one time with only one of such points. The switch-wheel of the receiver is placed in unison with the revoluble dial of the transmitter at the beginning of its operation or in such a position that the contacting device fastened thereto makes contact with the contact-point which is in the circuit of the service instrument of the subscriber to whom the transmitter and receiver belong. As the number of teeth on the switch-wheel of the receiver, the number of contact-points circularly arranged on the base thereof, and the number of names, numbers, or other designations on the face of the dial are all equal and as the mechanism arranged to propel the switch-wheel with a step-by-step movement is so operated as to cause the switch-wheel to always coincide in position with the position of the revoluble dial, it will be seen that the contact-point with which the contact device fastened on the switch-wheel makes contact coincides with the name, number, or other designation appearing beneath the panel g on the face of the transmitter. The connection established by the revolution of the dial of the transmitter is thus always with the subscriber whose name, number, or other designation appears beneath the panel g.

My receiver is illustrated in detail in Figs. 6 to 9, inclusive. Referring to these figures, R represents the base of the receiver and, as above stated, is made of wood or other insulating material. On this base are arranged in circular series contact-points corresponding in number to the total number of subscribers in the system. Each of these contact-points is connected by an insulated wire p in a suitable manner, such as by the twisted connection shown at p', with a service instrument and also, as will hereinafter be more fully described, with the corresponding contact-points of all the other receivers in the system. The receiver which I illustrate is designed for use in a system of eighty subscribers; but additional expansion of the system is rendered possible through the spaces a left for the insertion of additional contact-points. These spaces are preferably arranged in regular series among the contact-points and must of course coincide in position with the position of similar spaces on the face of the revoluble dial of the transmitter. I have numbered the contact-points with numbers corresponding with the numbers on the face of the dial, thus indicating that the position of the contact-points coincides with the position of the names, numbers, or other designations on such dial. In order to economize space and to reduce the size of the switch-wheel and parts connected therewith, I have further arranged the contact-points in concentric series and have staggered the same relatively to each other, so that the contact-spring T, which is arranged to sweep over both circles of contact-points, will, while contacting with each point in succession, make contact at any one time with only a single contact-point. Centrally within the base upon an upward extension of the base-plate S is revolubly mounted the switch-wheel W. The switch-wheel W is formed with a toothed periphery, the teeth of which slant only in one direction and are equal in number to the number of contact-points arranged in circular series below the same. To the switch-wheel is rigidly secured the bent lever U, to the lower end of which is attached the contact-spring T. Movement of the switch-wheel results in corresponding movement of the contact-lever U, and the size of the teeth of such switch-wheel is so regulated that the forward movement of the same the distance of a single tooth is sufficient to move the contact-spring T from one contact-point to that next adjacent thereto. The step-by-step forward movement of the switch-wheel is effected by the action of the stepping-levers V and V', which are mounted diametrically opposite to each other in trunnion-bearings formed in the base-plate S and are formed with toothed surfaces which correspond in shape and size to the space between adjacent teeth of the switch-wheel. The screws $v$, which serve to support the stepping-levers V and V', are capable of adjustment, so that the stepping-levers may be staggered sufficiently to cause one of such levers to strike against the side of the teeth of the switch-wheel with which it will next come in contact when the other stepping-lever is in engagement with the switch-wheel. The stepping-levers alternately engage with the switch-wheel, and each drives the same forward half a tooth, so that the combined action of both stepping-levers is necessary to cause the forward movement of the switch-wheel through the space of a complete tooth. The connection existing between the stepping-levers and the actuating mechanism therefor is as follows: Beneath the switch-wheel W on either side of the base-plate S are supported the electromagnets X. These magnets are preferably secured at one end to the metallic yoke S', which in its turn is rigidly fastened to the base-plate S. The holes in the metallic plate S' for the passage of the screws which attach the electromagnet S thereto are preferably slot-shaped in order to permit adjustment of the magnets relative to the position of the armature $t$, which is used in connection therewith. The armature $t$ is arranged across one face of the electromagnets X and is supported by means of the rods $r$ and $r'$, which serve to connect the stepping-levers V and V'. The rod $r$ extends from the stepping-lever V' through a suitable opening formed in the base-plate S through the armature $t$. The portion of the rod which extends through the armature $t$ is screw-threaded, and the locking-nuts $r^2$ and $r^3$, which are mounted thereon on both sides of the armature, permit adjustment of the relative position of the stepping-levers and the secure fastening of said rod $r$ to the armature. Connection between the armature and the stepping-lever V is effected by means of the forked lever $r'$. The length of the connection between the two stepping-levers V and V' is such that one of the stepping-levers is always in engagement with the switch-wheel and the other stepping-lever out of engagement therewith. Normally when the circuit through the receiver is open and the armature $t$ is not in contact with the poles of the electromagnet X the stepping-lever V' is held in engagement with the toothed periphery of the switch-wheel by the action of the spring $q$. The spring $q$ is, however, adapted to yield and permit outward movement of the stepping-lever V' each time the armature $t$ is energized. It is to be noted that a cam-shaped slot is formed in the yoke S' to permit the passage of the rod $r$, which in part establishes the connection between the stepping-levers V and V'.

The operation of my receiver is as follows: The base-plate S and all parts in connection therewith are connected with the ground through the leading-wire Z' and the battery $Z^2$, which furnishes the current for the operation of the entire system. Whenever the circuit through the transmitter is completed by the action of the circuit making and breaking device and the electromagnets X are accordingly energized, the armature $t$ is attracted and the stepping-levers V and V' act to carry the switch-wheel S forward through a distance equal to half a tooth. When the circuit through the transmitter is broken, the stepping-levers V and V' serve to carry the switch-wheel through a distance equal to another half a tooth, and thus to cause the contact-spring T to make connection with the contact-point next adjacent to that with which it was previously in contact. The step-by-step movement of the switch-wheel of the receiver takes place with each making and breaking of the circuit through the transmitter and results in causing the switch-wheel of the receiver to always coincide in position with the dial of the transmitter and to always establish the connection between the service instrument of the subscriber to whom the receiver and transmitter belong and the service instrument of the subscriber whose name, number, or other designation appears beneath the panel $g$ on the face of the transmitter.

*Operation of the system.*—The operation of the transmitter and receiver in the system in which I especially design to use them, although they may also be used in connection with other systems, if desired, can be easily understood from the diagrammatic view of an automatic telephone-exchange system of three subscribers, which is shown in Fig. 10.

It will be there seen that a switching-wire Z connects the base-plate of each transmitter and all parts in connection therewith with the base-plate of each receiver and all parts in connection therewith, that the circuit making and breaking spring of each transmitter is connected to the ground by a leading-wire Y, and that the electromagnet of each receiver is also grounded through a corresponding leading-wire Z'. The wires leading from the receivers to the ground are all connected together, and an energizing-battery $Z^2$ is introduced between the receivers and the ground. Each of the contact-points of the receivers of the systems is connected to the service instrument, such as a telephone, of the subscriber whose number corresponds with the number of such contact-point by service-wire M, and also to the contact-points of the remaining receivers of the system which bear the same number. Normally the contact-spring secured to the switch-wheel of each receiver makes contact with the contact-point corresponding to the subscriber to whom such receiver belongs, and the name of the subscriber appears beneath the panel $g$ on the face of his transmitter. When it is desired to establish any desired connection, the dial of the transmitter is revolved until the name of the subscriber with whom the connection is desired to be established appears beneath the panel $g$ on the face of the same. While this movement has been taking place, the switch-wheel of the receiver has been correspondingly revolved through the operation of the stepping-levers provided therefor, and the contact-spring which is fixed to the switch-wheel has moved a distance corresponding to the movement of such switch-wheel of the receiver or of the dial of the transmitter and has stopped when in contact with a contact-point corresponding with the name, number, or other designation of the subscriber whose name appears beneath the panel $g$ on the face of the transmitter. Connection is thus established between the subscriber who has been operating his transmitter and the subscriber whose name appears beneath the panel of the face of such transmitter. If desired, more than two subscribers can place themselves in communication at the same time by successively establishing connection with each other through the use of their transmitters.

It is apparent that my invention is not restricted to the details of the construction which I have described herein, and I do not limit myself to the precise details of such construction; but

What I claim as new, and desire to secure by Letters Patent, is—

1. In a transmitter, the combination with a shaft, a dial mounted thereon, and a worm-wheel also mounted thereon, of a worm-shaft for rotating said worm-wheel, a fork mounted thereon, and a contact-spring adapted to be engaged by said fork, substantially as described.

2. In a transmitter, the combination with a shaft, a dial mounted thereon, and a worm-wheel also mounted thereon, of a worm-shaft for rotating said worm-wheel, projections formed thereon, and a contact-spring having an insulating-block secured thereto adapted to be engaged by said projections, substantially as described.

3. In a transmitter, the combination, with a dial, and a shaft provided with means for rotating the same, and provided with flattened portions, of a spring bearing against the shaft and adapted to encounter the flattened portions thereof as the shaft revolves, thereby causing the shaft and dial to occupy fixed and definite positions when at rest, and a circuit making and breaking device arranged to operate as the dial rotates, the positions of rest of said shaft fixed by the spring corresponding to open-circuit positions of the circuit making and breaking devices, substantially as described.

4. In a receiver, the combination with a circular series of contact-points, a switch-wheel centrally located therein, said wheel having teeth circularly arranged thereon equal in number to the number of contact-points, and an arm carried by said switch-wheel adapted to successively make contact with said contact-points, of an electromagnet, an armature therefor, and two stepping-levers engaging said switch-wheel and connected to said armature, and adapted to move the wheel forward with a step-by-step movement, one on the forward movement of the armature and the other on the backward movement thereof, substantially as described.

5. In a receiver, the combination with a circular series of contact-points, a switch-wheel centrally located therein, said wheel having teeth circularly arranged thereon equal in number to the number of contact-points, and an arm attached to said switch-wheel and adapted to successively make contact with said contact-points, of stepping-levers adapted to rotate said switch-wheel with a step-by-step movement, an electromagnet, an armature therefor, and rods connecting said armature with said stepping-levers, substantially as described.

6. In a receiver, the combination with a circular series of contact-points, a switch-wheel centrally located therein, said wheel having teeth circularly arranged thereon equal in number to the number of contact-points, and an arm attached to said switch-wheel adapted to successively make contact with said contact-points, of stepping-levers adapted to rotate said switch-wheel with a step-by-step movement, an electromagnet, an armature therefor, and the adjustable rod $r$ and forked rod $r'$ connecting said armature with said stepping-levers, substantially as described.

7. In a receiver, the combination with a circular series of contact-points, the base-plate S, the switch-wheel W mounted thereon, said wheel having teeth formed on its periphery equal in number to the number of contact-points, the bent lever U, attached to said switch-wheel, and the contact-spring T, of the stepping-levers V and V', the electromagnet X, the armature $t$, and the rods $r$ and $r'$ connecting said armature and said stepping-levers, substantially as described.

In testimony whereof I affix my signature in presence of two witnesses.

EMERY A. CLARK.

Witnesses:
ELIZABETH HANKS,
A. VAN WAGENEN.